United States Patent
Ruschell et al.

(10) Patent No.: US 6,591,863 B2
(45) Date of Patent: Jul. 15, 2003

(54) ADJUSTABLE POOL SAFETY VALVE

(75) Inventors: Marwood Ruschell, Okeechobee, FL (US); George Pellington, Safety Harbor, FL (US)

(73) Assignee: Vac-Alert IP Holdings, LLC, Fort Pierce, FL (US)

( * ) Notice: Subject to any disclaimer, the term of this patent is extended or adjusted under 35 U.S.C. 154(b) by 0 days.

(21) Appl. No.: 09/954,403

(22) Filed: Sep. 18, 2001

(65) Prior Publication Data

US 2002/0124888 A1 Sep. 12, 2002

Related U.S. Application Data

(60) Provisional application No. 60/274,954, filed on Mar. 12, 2001.

(51) Int. Cl.[7] ................................................ F16K 17/00
(52) U.S. Cl. ...................... 137/467; 137/114; 137/540; 137/907
(58) Field of Search ................................ 137/114, 540, 137/467, 907

(56) References Cited

U.S. PATENT DOCUMENTS

| | | | | |
|---|---|---|---|---|
| 2,959,188 A | * | 11/1960 | Kepner | 137/540 |
| 5,477,879 A | * | 12/1995 | Vos | 137/513.5 |
| 5,682,624 A | * | 11/1997 | Ciochetti | 137/907 |
| 5,991,939 A | * | 11/1999 | Mulvey | 4/504 |
| 6,098,654 A | * | 8/2000 | Cohen et al. | 137/467 |

* cited by examiner

Primary Examiner—Stephen M. Hepperle
(74) Attorney, Agent, or Firm—Kevin Redmond

(57) ABSTRACT

A safety valve for swimming pools that senses and then instantly relieves excessively high vacuum levels in the pool's drain line. Such high vacuum levels occur when an individual becomes trapped by the suction at the pool's drain port which is connected to the drain line. The valve relieves the high vacuum level in the pool's drain line and the suction at the drain port by bleeding air into the pool's drain line, causing the pump connected to the drain line to lose prime. The valve is equipped with means for adjusting the vacuum level at which it actuates to accommodate varying vacuum levels found at different pools.

10 Claims, 4 Drawing Sheets

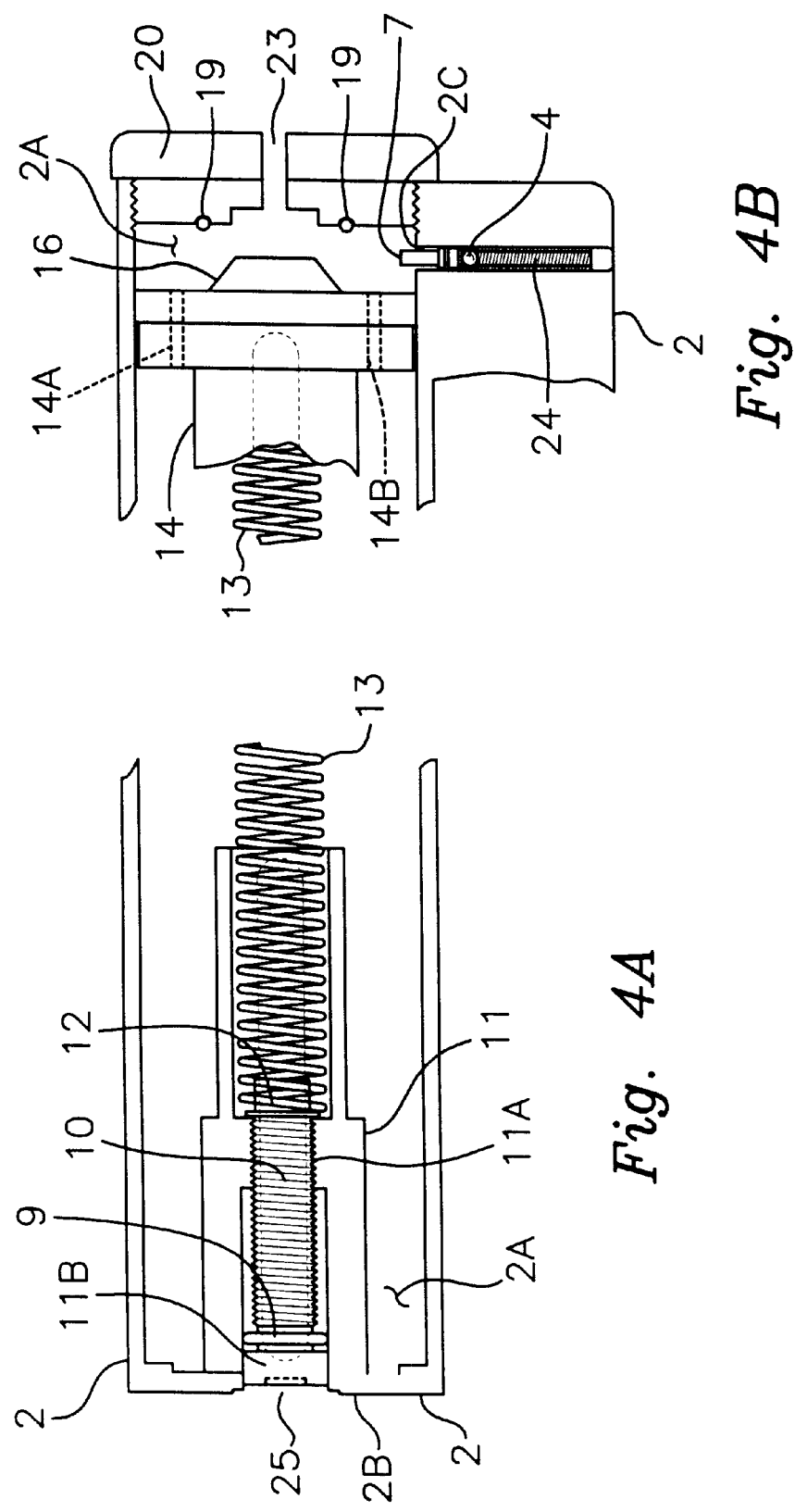

ADJUSTABLE POOL SAFETY VALVE

This application claims benefit of U.S. Prov. No. 60/274,954 filed Mar. 12, 2001.

BACKGROUND

1. Field

The present invention relates to pool safety valves that bleed air into the pool's drain line to relieve excessively high vacuum levels causing the pool's pump to lose prime and more particularly to such valves that include provisional to adjust on site the trip level at which air is bled into the pool's drain line.

2. Prior Art

There have been numerous cases of serious injuries and deaths caused by high vacuum levels at a pool's drain port which holds an individual to the drain port and in some cases causes disembowelment. When such an incident occurs, the vacuum level in the drain line leading from the drain port to the pool's pump rises sharply.

Various safety valves have been developed in which the high vacuum level occurring during such incidents is sensed and used to trip the valve and allow air to bleed into the drain line, causing the pump to lose prime. Although such valves function to some degree, they generally exhibit two problems. The first is they are often set at the factory to a predetermined trip level which does not always correspond to an appropriate level for a particular pool. Variations in pumps, pipe diameters, pipe length and the number of turns and pitches in a pipe line, all affect the vacuum level at which a safety valve's trip level should be set. This setting is best done at the pool site.

The second problem is related to the valve's reliability. Virtually all valves include gaskets which must remain sealed if the valve is to function properly. If a gasket becomes dislodged from its seat, it can allow air to leak around the closure elements of the valve, causing the pump to lose prime when there is no emergency. This effectively shuts down the pool and can only be remedied by removing the valve and having it repaired, which often requires the valve to be returned to the factory.

A safety valve is needed which can be easily adjusted in the field by a service technician to a trip level that is appropriate for each site. For improved reliability, a safety valve is needed that overcomes the leakage past gaskets that often occurs because the gasket becomes unseated. These needed improvements are provided by the valve of the present invention described in the following sections.

BRIEF DESCRIPTION OF THE FIGURES

FIG. 4A is a side cross sectional view of the end of the safety valve housing which contains the valve adjustment access port point.

FIG. 4B is a side cross sectional view of the end cap valve closure elements and the lock out pin 2mechanism for maintaining the valve open once the valve has been tripped.

SUMMARY

An object of the present invention is to provide a pool safety valve which can be adjusted on site to a selected trip level to accommodate the varying vacuum level found at different pools.

An object of the present invention is to provide a valve with a cone-shaped plunger element that adjusts for wear to extend the operating life of the valve.

An object of the present invention is to provide a pool safety valve which prevents air leakage about the valve closure elements to further extend the opening life of the valve.

The present invention is a safety valve for swimming pools that senses and then instantly relieves excessively high vacuum levels in the pool's drain line. Such high vacuum levels occur when an individual becomes trapped by the suction at the pool's drain port. The drain port is connected to the pool's pump by way of the drain line. The valve relieves the high vacuum levels in the pool's drain and the suction at the drain port by bleeding air into the drain line, causing the pump to lose prime. The valve is equipped with means for adjusting the vacuum level at which it actuates to accommodate varying vacuum levels found at different pools.

The valve closure element includes a cone-shaped plunger which engages a sealing O-ring. Wear or ageing of these elements is accommodated by the cone shaped plunger which simply moves further into the O-ring as the opening in the O-ring increases to insure closure of the valve. Another failure which occurs with some valves with age is in a gasket seal which is usually positioned behind the O-ring. If the gasket becomes separated from its seat, air is then allowed to leak about the O-ring, which will cause valve failure. In the present invention, the gasket is clamped in place, preventing it from loosening its position and preventing air from leaking past the O-ring. The valve life is significantly improved by these features.

The pressure applied to keep the valve elements closed determines the vacuum level at which the valve will open or be tripped. In the present invention, a screw adjustment which increases the spring pressure placed against the valve closure elements is accessible from outside of the valve to allow the valve to be easily set at each pool site by the installer to a different trip level as necessary to accommodate the different vacuum levels found at each pool site.

DETAILED DESCRIPTION OF THE INVENTION

Figure 1:
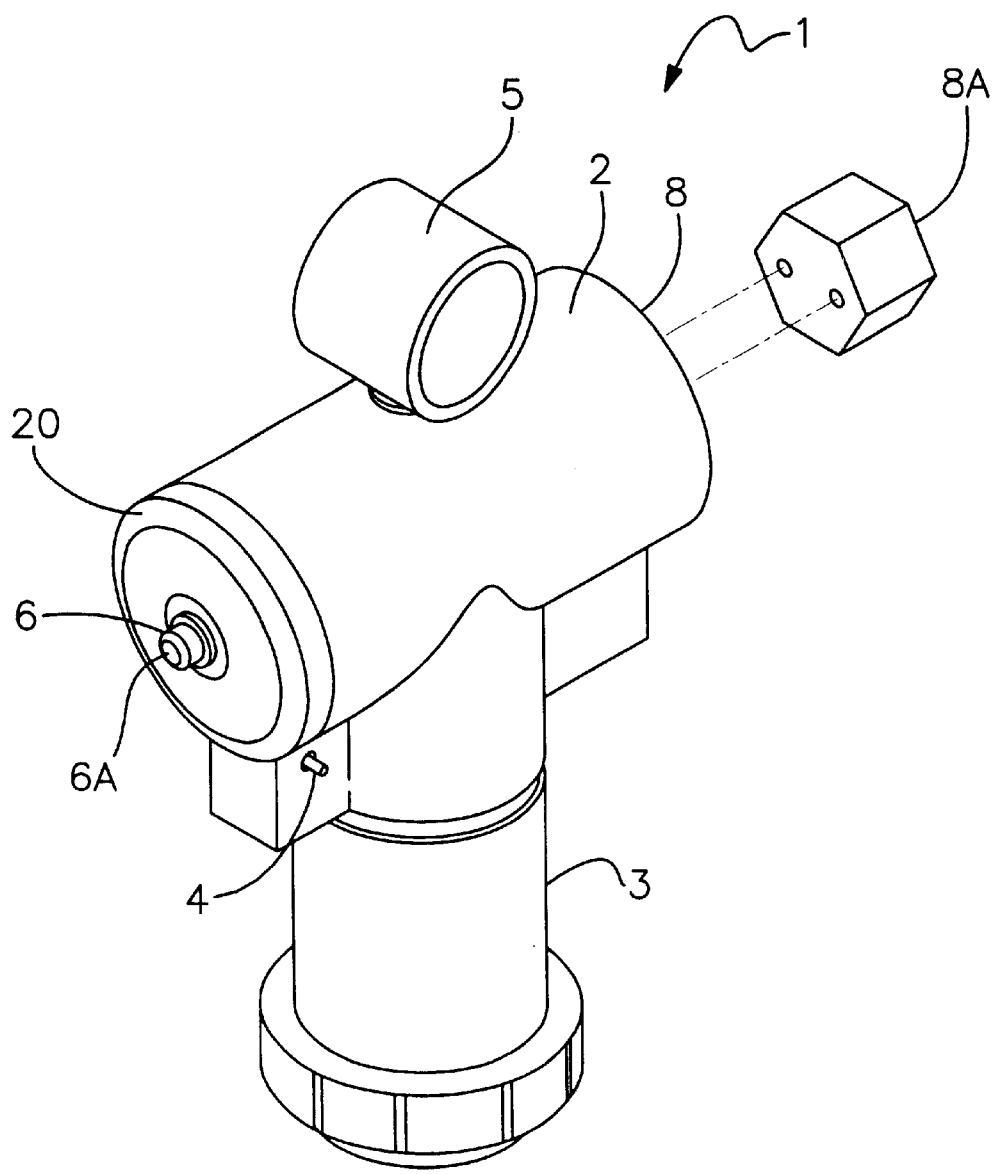
FIG. 1 is a prospective view of the present invention showing it to include a safety valve housing, a connection to the pool's drain line, a lock out pin release, an end cap, an air vent, and a vacuum gage.

FIG. 1 is a prospective view of the present invention 1, showing it to include a safety valve housing 2, a coupling section 3 located beneath the housing, a lock out pin release 4 on the lower section of the housing, an end cap 20 located at the left end of the housing, an air vent 6 and a screen 6A located to the left in the end cap and a vacuum gage 5 located on top of the housing. In the use of this valve, a stub line connected to the drain line by means of a "T" rises upward from the drain line and is connected to the coupling section 3. This stub couples the vacuum in the drain line to the valve. This vacuum level can be read at the vacuum gage 5 and this reading is used to set the trip level of the valve.

A security cap 8 on the right side of the housing is removed with a special tool 8A and a screw driver is inserted, engaged and then rotated to set the trip level. When the valve is tripped, it allows air through vent 6 to pass through the valve and the coupling 3 to the drain line, causing the pump which is connected to the drain line to lose prime and free anyone trapped at the pool's drain port. Once the valve has been tripped, it is locked in the open or venting position by a lock out pin until it is manually released by pressing the lock out pin release 4.

Figure 2:
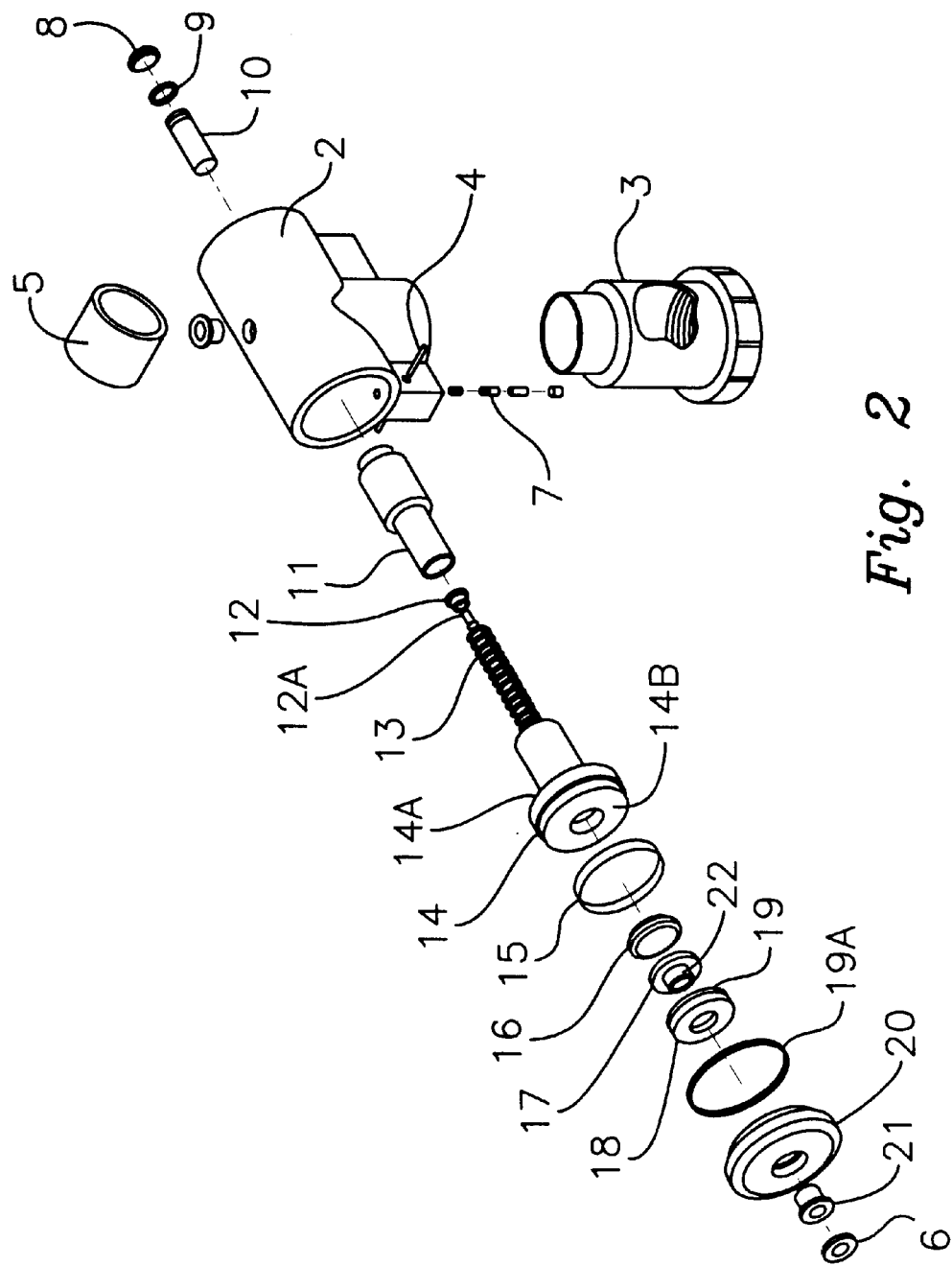
FIG. 2 is an exploded view of the present invention showing the internal elements of the valve.

FIG. 2 shows the valve in an exploded view of the internal components of the valve which include from right to left in this Figure, a security cap 8, a second "O"-ring 9, an adjustment screw 10, a sleeve for the main piston 11, a spring guide retainer 12, a screw 12A which holds the retainer to the sleeve, a main spring 13, a main piston 14, a bearing ring 15, a cone-shaped plunger 16, a sealing bushing 17, a gasket 18, a first "O"-ring 19, a third "O"-ring 19A, the end cap 20, a compression bushing 21 and interconnected threads 22 of the sealing bushing 17 and compression bushing 21. These components are placed together within the safety valve in the same order as they are listed above. The security cap 8 is used to close the right end of the housing and discourage unauthorized adjustment of the valve's trip level.

Figure 3:
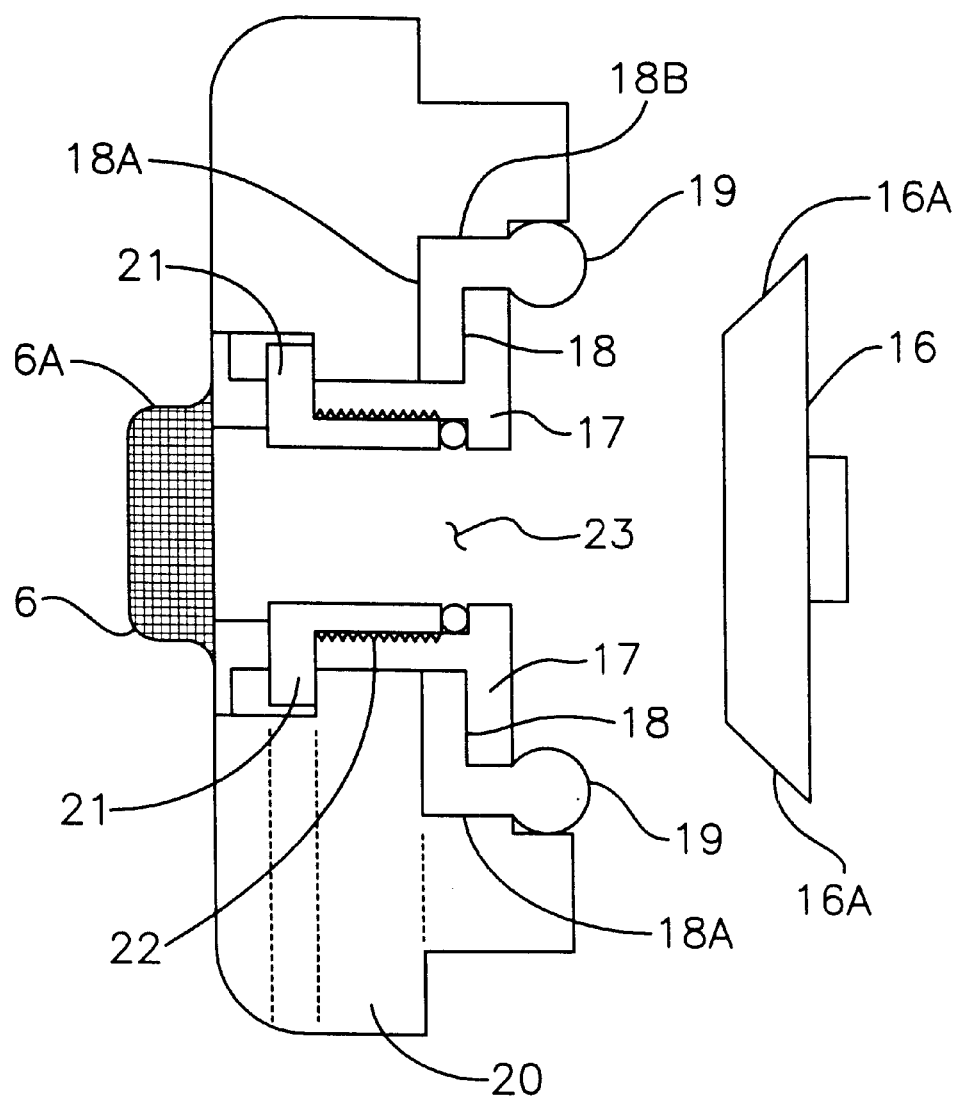
FIG. 3 is an enlarged cross sectional view of the valve's end-cap showing the valve closure elements including a gasket, an "O"-ring and a cone shaped plunger which is designed to engage the "O"-ring to close the valve.

FIG. 3 is an enlarged cross sectional view of the valve's end cap 20 showing the valve's closure elements including the gasket 18, the first "O"-ring 19, and the cone shaped plunger 16. The plunger is designed to engage the "O"-ring 19 and close the valve. The cone shaped plunger 16 is in reality a truncated cone. The flattened area at the truncation is designed to permit the plunger to contact the "O"-ring without receiving interference from the sealing bushing 17, located just to the left of the "O"-ring in this Figure.

In the operation of the closure elements, the tapered edges 16A of the plunger are pushed into engagement with the "O"-ring to make contact with the "O"-ring and seal off the air from a passageway 23 which passes through the center of the end cap. When the valve is opened, air flows through the screen 6A at the vent 6 on the left of the end cap, through the passageway 23, and the coupling 3 and then on to the pool's drain line. The screen 6A, located over the vent is designed to keep debris and insects from entering and clogging the valve. As the "O"-ring wears with age, the tapered edges of the cone shaped plunger simply move further into the "O"-ring to maintain contact with the "O"-ring, thereby extending the life of the valve.

A second factor extending the life of the valve is in the design of the gasket 18, the sealing bushing 17, and the compression bushing 21, all of which are located in the end cap 20, as shown in FIG. 3. The gasket 18 is formed of two parts, a vertical or flat gasket portion and a horizontal web portion which is attached at its right end to the first "O"-ring 19.

In some prior art valves, the gasket only has a horizontal web portion which is located in a round slot in the end cap. If the web is dislodged or simply separated from the wall of the slot, air from the passageway 23 will find its way about the web and leak past the closure elements, the "O"-ring and plunger, to defeat the valve. In this case, the valve appears to be open when it is intended to be closed. The pump loses prime and the pool cannot be operated.

To overcome this problem in the present invention, the flat gasket portion is clamped between the sealing bushing 17 and compression bushing 21. This prevents any air from leaking around the bushing. These two bushings are threaded together to clamp the flat gasket between them. The intermeshed threads of these bushings is at location 22, as can be seen in FIG. 3.

The way in which the closure elements are drawn together to close the valve and the force used to open the valve is best explained with reference to FIG. 2. The closure elements are urged into contact by the force of the spring 13 that presses against the main piston which in turn presses against the plunger 16. The plunger 16 is attached to the main piston and is pressed against the "O"-ring to close the valve.

The "O"-ring 19 in this Figure is actually attached to the flat gasket as shown in FIG. 3. When an excessive vacuum occurs in the drain line, it is transmitted through the coupling 3 into the housing and through holes in the main piston 14, drawing the plunger back which, in this case, is to the right in FIG. 3. That action draws the plunger back and away from the "O"-ring. The result of this action is the opening of the closure elements which allows air in the passageway 23 to flow past the closure element to the coupling section and the drain line.

The pressure applied by the spring can be varied to adjust for the normal operating vacuum level found at different pool sites. This is done by first removing the security cap, which is simply threaded out of the housing. A screw driver is applied to the adjustment screw 10 which has t threads on it periphery that engage the housing. As the adjustment screw 10 is advanced into the housing, it passes through a central hole in the sleeve 11 and presses against the spring, increasing the spring's pressure against the main piston and the cone plunger 16. Threading the adjustment screw in the opposite direction has the opposite effect, resulting in reducing the pressure on the plunger.

At a particular site, the actual required spring adjustment can be determined by installing the safety valve and adjusting the spring tension until no air leakage occurs through the vent 6. Once properly set, vacuum levels above "normal" operating will cause the plunger to pull back and the valve is opened.

Once the valve is opened, it must be locked in the open position to allow individuals trapped at the drain port to leave the vicinity of the drain port. This is done by means of a lock out pin 7 which rides on a bearing ring 15 The bearing ring is mounted on the main piston 14. As the piston 14 is pulled back by the excess vacuum, the pin first rides on the ring 15 and then falls in front of the main piston 14, preventing it and the plunger, to which it is attached, from returning to a closure position against the first "O"-ring 19. The only way that the piston can be released is by manually releasing it. This is done by pushing the lock pin release 4 on the lower side of the pump housing. This is only done after any individual that has been trapped at the drain port is well clear of the port.

It should be noted that the bearing ring 15 serves an important function other than as a bearing surface for the lock out pin 7. It is also used to seal the piston about its periphery, preventing air from the passageway 23 from bypassing the main piston. Once the valve closure elements have opened, the air presses against the main cylinder forcing it back to the position where it is locked by the lock pin.

A portion of the air pressing on the face of the piston is allowed to pass through holes 14A and 14B and on through the coupling section 3 to cause the pool pump to lose prime. These holes are large enough to allow sufficient air to pass to cause the loss of prime, but are small enough to allow the pressure of the air to move the cylinder. There is a critical range in hole size that is maintained to accomplish both functions.

The remaining components shown in FIG. 2 have simple mechanical function and require no further explanation as their functions are obvious from their respective name which are listed in connection with the description of FIG. 2 above.

We claim:

1. A vacuum safety valve for a pool, said pool having a vacuum pump and a drain line said drain line having a first and second end, said first end of said drain line being connected to said pool and said second end of said drain line being connected to said vacuum pump, said vacuum safety valve being connected to said drain line between said first and second ends of said drain line by way of a stub, said valve releasing air into said drain line to cause said pump to lose prime when the vacuum level in said drain line exceeds a predetermined level, comprising:

(a) a housing having an exterior and an interior, said interior of said housing containing a channel, (b) a vacuum port in said housing passing from the exterior of said housing to a first point in said channel, said drain line being connected to said vacuum port by way of said stub and said drain line being further connected through said stub and vacuum port to said first point in said channel by way of said vacuum port, (c) a vent port in said housing passing from the exterior of said housing to a second point in said channel to connect said channel to the atmosphere external to said housing at said vent port, (d) a releasable blocking means located in said channel between said first and second points to block the flow of air through said channel from said vent port to said vacuum port, said releasable blocking means normally being in a blocking position in said channel, wherein said releasable blocking means includes:

(i) a spring having a first and a second end and a longitudinal axis running from said first to said second end of said spring, said spring being located within said channel in said housing with the first end of said spring resting against and being supported by said housing, (ii) a piston located within and in slidable contact with said channel in said housing to prevent air flow past said piston where it contacts said channel, said piston having a first and a second end on opposite sides of said piston, and a central axis running between said first second end, said piston being capable of moving in the direction of said central axis in said channel and positioned with said second end of said piston in contact with said first end of said spring, and said piston having a hole passing through it from it's first to it's second end to control the amount of air passing through said piston, (iii) a plunger being located in said cavity within said housing, said plunger having a first and second end on opposite sides of the plunger with said first end of said plunger being in contact with said second end of said piston without covering the hole in said piston, said first end of said plunger being cone shaped and said plunger having a central axis extending through said first and second ends of said plunger and passing through the apex of said cone, said plunger moving in said channel in the direction of its central axis, (iv) an end cap having a first and a second end on opposite sides of said end cap and said end cap being connected to said housing to said channel at its second end, said end cap having a hole through it from its first to its second end, said hole forming said vent port connecting the atmosphere to said channel, and (v) a first "O"-ring mounted in said end cap at its first end, and about said hole in said end caps, said first "O"-ring being exposed to said channel and facing said cone shaped second end of said plunger, said cone shaped end being pressed into engagement with said first "O"-ring by said spring to block the flow of air through said channel, and said plunger being pulled back from engagement with said first "O"-ring to release the block to the flow of air through said channel.

(e) means for releasing said releasable blocking means to permit air to flow from said vent port through said channel to said vacuum port when the vacuum level in said vacuum port exceeds said predetermined level, and (f) means for setting at the pool site said predetermined vacuum level at which said releasable blocking means is released to accommodate the different vacuum levels encountered at different pool sites.

2. A pool vacuum safety valve as claimed in claim 1 wherein said means for releasing said releasible blocking means is the vacuum level from said drain line transmitted to said channel and acting on the first end of said cylinder drawing said cylinder and plunger away from said first "O"-ring against said spring, air passes through a path which includes said vent port, said hole in said end cap, said first "O"-ring, said hole in said cylinder to reach said stub and drain line and to cause said pump to lose prime, said hole in said cylinder being sufficiently small to allow said vacuum level from said drain line to remain sufficiently high to draw said cylinder and plunger away from said first "O"-ring and the hole in said cylinder being sufficiently large to pass sufficient air to cause said pump to lose prime.

3. A pool vacuum safety valve as claimed in claim 2, wherein said means for setting at the pool site said predetermined vacuum level at which said releasible blocking means is released includes a shaft hole in said housing and a shaft having a first and second end and said shaft passing through said shaft hole in said housing with the second end of said shaft contacting the second end of said spring, said means for sitting at the pool site further including means for advancing said shaft against said spring to increase and adjust the pressure of said spring against said cylinder and the predetermined vacuum level at which said releasable blocking means is release.

4. A pool vacuum safety valve as claimed in claim 3 wherein said shaft includes threads about it sides and said shaft hole in said housing includes matching threads in said shaft hole to enable said shaft to be threaded from the outside of said housing into said hole and advance against said sprint to adjust the predetermined vacuum level at which said releasable blocking means is released.

5. A pool vacuum safety valve as claimed in claim 1 wherein said first "O"-ring is circular and said first "O"-ring has a central axis of rotation that passes through the center of said first "O"-ring, said first "O"-ring also has a first and second side lying in a first and second plane respective said first and second plane each being orthogonal to said central axis of rotation of said first "O"-ring said second side of said first "O"-ring facing said plunger, said central axis of rotation of said first "O"-ring and said central axis of said plunger being co-located to enable said cone shaped end of said plunger to advance further into said first "O"-ring as said first "O"-ring wears to enable said plunger and "O"-ring to continue to block the flow of air through said channel despite ware of the "O"-ring.

6. A pool vacuum safety valve as claimed in claim 5, wherein said first "O"-ring further includes an extension that includes a cylindrical portion and a radial portion, said cylindrical portion having a central axis of rotation co-located with said central axis of rotation said "O"-ring, said cylindrical portion having a first and second end lying in spaced apart parallel first and second planes that are orthogonal to said central axis of rotation of said first "O"-ring, said cylindrical portion having a diameter generally equal to said first "O"-ring along the second side of said cylindrical portion and said cylindrical portion being connected along the second side of said cylindrical portion to said "O"-ring, along the first side of said "O"-ring, said radial portion of said first "O"-ring being located in the first plane of said cylindrical portion located at the first end of said cylinder portion, said radial portion having an outside perimeter that is joined to said first end of said cylindrical portion and said radial portion having a hole centered about said central axis of rotation of said first "O"-ring to avoid blocking the hole in said end cap.

7. A pool vacuum safety valve as claimed in claim 6 wherein said first "O"-ring is clamped in place to said end cap to present said first "O"-ring from becoming unseated in said end cap.

8. A pool vacuum safety valve as claimed in claim 7 wherein said radial portion of said first "O"-ring is clamped within said end cap, said radial portion of said first "O"-ring being clamped by means of a nut with threads on its outside periphery which thread into said end cap and allows said nut to bear against said radial portion of said first "O"-ring.

9. A pool vacuum safety valve as claimed in claim 7 wherein said nut has a central axis of rotation and includes a hole centered about said central axis of rotation of said nut which passes through said nut, said end cap containing threads in said hole in said end cap which mate with the threads in said nut to accept the threading of said nut into said end cap and, said hole in said nut passing air from the atmosphere outside said end cap to said channel.

10. A pool vacuum safety valve as claimed in claim 1 wherein, said cone end of said plunger is truncated to avoid interference between said cone and said end cap while still providing a cone shaped contact with said "O"-ring to insure an air tight contact despite wear of the "O"-ring.

* * * * *